(12) United States Patent
Londono et al.

(10) Patent No.: US 10,450,769 B2
(45) Date of Patent: Oct. 22, 2019

(54) DOCKING STATION FOR A POOL CLEANER IN A POOL

(71) Applicant: AQUA PRODUCTS, INC., Cedar Grove, NJ (US)

(72) Inventors: William Londono, Wayne, NJ (US); Ethan Hanan, Teaneck, NJ (US); Aleksandr Klebanov, Bloomfield, NJ (US); Glenn Weismann, Cedar Grove, NJ (US)

(73) Assignee: AQUA PRODUCTS, INC., Cedar Grove, NJ (US)

( * ) Notice: Subject to any disclaimer, the term of this patent is extended or adjusted under 35 U.S.C. 154(b) by 0 days.

(21) Appl. No.: 15/578,572

(22) PCT Filed: Jun. 1, 2016

(86) PCT No.: PCT/US2016/035251
§ 371 (c)(1),
(2) Date: Nov. 30, 2017

(87) PCT Pub. No.: WO2016/196622
PCT Pub. Date: Dec. 8, 2016

(65) Prior Publication Data
US 2018/0155946 A1    Jun. 7, 2018

Related U.S. Application Data

(60) Provisional application No. 62/169,963, filed on Jun. 2, 2015.

(51) Int. Cl.
*E04H 4/16* (2006.01)
*A47L 7/00* (2006.01)
(Continued)

(52) U.S. Cl.
CPC .......... *E04H 4/1654* (2013.01); *A47L 7/0004* (2013.01); *B08B 9/093* (2013.01);
(Continued)

(58) Field of Classification Search
CPC .......... A47L 2201/04; A47L 2201/024; A47L 2201/02; A47L 7/0004; A47L 9/2873; E04H 4/1654; B08B 9/093; B63B 35/32
(Continued)

(56) References Cited

U.S. PATENT DOCUMENTS 7,037,038 B1 * 5/2006 Haski ..................... B63B 35/32
                                                             210/242.1
2003/0201218 A1   10/2003 Henkin et al.
(Continued)

FOREIGN PATENT DOCUMENTS

WO    2014097304    6/2014

OTHER PUBLICATIONS

EP16804326.3, "Extended European Search Report", dated Jan. 29, 2019, 7 pages.
(Continued)

*Primary Examiner* — Claire A Norris
(74) *Attorney, Agent, or Firm* — Kilpatrick Townsend & Stockton LLP; Dean W. Russell, Esq.

(57) ABSTRACT

A docking station which can releasably engage and hold a robotic pool cleaner, the docking station optionally including a pre-filter for coarse debris, the pool cleaner including an internal filter and a pump to suction in, filter and eject filtered water while the pool cleaner is coupled to the docking station. The pool cleaner's pump creates water jets to provide propulsion for the pool cleaner and to aid in decoupling the pool cleaner from the docking station.

23 Claims, 9 Drawing Sheets

(51) Int. Cl.
*C02F 1/00* (2006.01)
*E04H 4/12* (2006.01)
*B08B 9/093* (2006.01)
*C02F 103/42* (2006.01)

(52) U.S. Cl.
CPC ........... *C02F 1/004* (2013.01); *A47L 2201/02* (2013.01); *B08B 9/0933* (2013.01); *C02F 2103/42* (2013.01); *E04H 4/1272* (2013.01)

(58) Field of Classification Search
USPC ................. 210/167.1, 167.14; 15/1.7; 4/490
See application file for complete search history.

(56) References Cited

U.S. PATENT DOCUMENTS

| | | |
|---|---|---|
| 2013/0318728 A1 | 12/2013 | Bernini |
| 2014/0263087 A1* | 9/2014 | Renaud ................. E04H 4/1654 210/745 |
| 2015/0102772 A1 | 4/2015 | Witelson et al. |
| 2015/0314453 A1* | 11/2015 | Witelson ................. B25J 11/00 320/108 |

OTHER PUBLICATIONS

PCTUS2016035251, "International Search Report and Written Opinion", dated Sep. 1, 2016, 9 pages.

* cited by examiner

DOCKING STATION FOR A POOL CLEANER IN A POOL

CROSS REFERENCE TO RELATED APPLICATIONS

This patent application claims the benefit of U.S. Provisional Application No. 62/169,963, filed Jun. 2, 2015, the content of which is incorporated by reference herein in its entirety.

FIELD OF THE INVENTION

This invention relates to a docking station in a pool for a pool cleaner that can continue filtering while it is docked, and furthermore to a docking station which includes an initial or pre-filtering stage for pool water before it enters the pool cleaner that has been docked at the docking station.

BACKGROUND AND PRIOR ART

Pool cleaners can be self-propelled robotic cleaners which are powered and often controlled by a remote power supply with a controller via an electrical power cable to which the pool cleaner is tethered. Such pool cleaners are propelled over a surface of the pool being cleaned which includes the bottom surface, and for some models, the sidewalls of the pool.

The pool cleaners can be propelled by water jets produced by internal pump propellers driven by an electric motor, in which a high pressure jet stream is selectively directed out of a discharge conduit or outlet port to urge the cleaner in a forwarder rearward direction across the surfaces of the pool. Other propulsion designs can include wheels or tracks that are driven directly or via a transmission arrangement with an electric motor. During operation, pool water is suctioned into a bottom inlet, filtered in an interior chamber and the filtered water is discharged out of the discharge conduit or port. The filter elements can take many forms, such as baskets, cartridges, filter bags, perforated screen or any other filtering element that can to collect and retain debris suspended in the water beneath the cleaner.

The movement of the robotic cleaner can be random, but is preferably in accordance with one or more cleaning program algorithms that are stored in memory of a controller. The controller can be located on-board the cleaner, for example, in the motor housing. Alternatively, the controller is located remotely in the remote power supply and control signals are sent to the cleaner via the power cable. The cleaning programs control the direction of travel and/or steering as the cleaner moves over the surfaces of the pool being cleaned.

While a typical robotic pool cleaner removes debris from the pool surfaces as it traverses a variety of paths in the pool, when the cleaning pattern is completed, it may be desirable to continue filtering of the pool water without the cleaner moving along the pool surfaces. That is, it is desirable to have the pool cleaner parked in a stationary location designated herein as a "docking station", where the pool cleaner is removably attached but can continuously filter pool water. Objects and summary of the invention are presented below.

SUMMARY OF THE INVENTION

One object is to provide a docking station at or below the water level in a pool, where a robotic pool cleaner can be engaged to the docking station and can continue to filter pool water.

Another object is for the docking station to include a pre-filtering stage for relatively large debris or for any debris before the water enters the pool cleaner.

A further object is for the docking station to include a latch for releasably holding the pool cleaner onto the docking station while it is docked and to provide a mechanism for releasing the latch on command or from a timed program.

A still further object is for the pool cleaner to include its own filter for water that has passed the pre-filtering stage of the docking station. A still further object is for each of said pool cleaner filters to employ a filter bag in the flow path of the inlet ducts into the pool cleaner.

An additional object is for the pool cleaner to comprise a perforated screen to generally enclose and protect the motor, shaft and propellers from debris and from contact with the filter bags.

A further object is to include in the pool cleaner a programmable controller that can direct the pool cleaner to follow predetermined paths or routines, where such controller may be remotely directed, or directed by signals transmitted by a cable originating outside the pool, or operated by its own internal program.

Another object is for said pool cleaner pump and outlet ducts to create propelling water jets to urge movement of the pool cleaner in the forward or rearward direction.

An additional object is to provide a movable panel in the vicinity of the docking station inlet to partially constrict the area of inlet flow, thus causing a more rapid water flow for entraining debris to the pre-filter in the docking station. It is a further object for this panel, if employed, to have buoyancy such that its top edge is normally situated slightly below the top surface of the water flowing over it, thus reducing the area of the water flow path and increasing the water flow speed.

Another object is to provide an optional inlet ramp below the docking station to help guide and align a pool cleaner when it approaches the docking station, so that its forward end will contact and engage the docking station's latching element for proper coupling with the docking station.

A still further object is to provide optional control means for an operator via the electrical tether cable to direct the electric motor and propellers to rotate in a first direction for discharging a water jet outward of the front end, or to rotate in the opposite direction for discharging a water jet outward of the rear end.

These and other objects are exemplified by the embodiments described below.

Embodiment 1

A docking station for a pool cleaner that is operable in a pool of water where said pool cleaner having (i) a body with front and rear portions and a lower portion, (ii) an internal chamber containing a pump and a water filter, said internal chamber having front and rear outlets in said front and rear portions respectively of said body, and having an inlet in said lower portion, (iii) a programmable controller configured to operate said pump to direct filtered water through said front or rear outlets, (iv) a valve in each of said outlet ducts, where each of said valves is openable when a water jet is pumped out of said outlet, and (v) rotationally mounted supports on said lower portion of said body, said docking station being attachable to a pool structure, said docking station comprising:

a. a frame with a water chamber therein, b. a fastener having open and close states for releasably coupling said pool cleaner to said frame, and c. a duct system including an inlet for receiving pool water and a water outlet, whereby said pool cleaner can cooperate with said docking station: in a first mode where said pool cleaner is inactive, or a second mode where said pool cleaner draws in pool water from said docking station, filters and discharges filtered pool water back into said pool, or a third mode where said pool cleaner decouples from said docking station.

Embodiment 2

The docking station according to Embodiment 1, where said valve in said pool cleaner outlets are biased to be closed until water is pumped through said first or rear outlet, and where said pool cleaner is configured:

a. to discharge filtered water as a rear water jet through said rear outlet while said front outlet is closed during said second mode, or b. to discharge filtered water as a front water jet through said front outlet while said rear outlet is closed during said third mode.

Embodiment 3

The docking station according to Embodiment 2 wherein said fastener comprises a paddle movable between said open and closed states, and in said third mode said front water jet strikes and moves said paddle to its open condition, whereby said pool cleaner is de-coupled from said docking station and said front water jet urges said pool cleaner to move downward from said docking station.

Embodiment 4

The docking station according to Embodiment 1 where said pool cleaner in said second mode is coupled to said docking station in an orientation where said pool cleaner's at least one inlet is aligned with the docking station's at least one outlet, such that the pump in said pool cleaner can suction water into and through said docking station's water chamber and into and through said pool cleaner's filter, and thereafter discharge filtered water through a selected one of said pool cleaner's outlets.

Embodiment 5

The docking station according to Embodiment 1 further comprising a pre-filter in said frame, whereby said pump in said pool cleaner can suction water through said pre-filter before said water enters said pool cleaner.

Embodiment 6

The docking station according to Embodiment 1, further comprising an inlet restrictor that is adjustable to vary the speed of the pool water that is drawn into said water chamber of said docking station.

Embodiment 7

The docking station according to Embodiment 6 where said inlet restrictor restricts said inlet opening into said water chamber, and to thereby increase the speed of water flow of said pool water entering said water chamber in said docking station.

Embodiment 8

The docking station according to Embodiment 6 where said inlet restrictor comprises a panel having upper and lower portions and being pivotable about said lower portion and has buoyancy such that said upper portion tends to be positioned below the top surface of the water flow of said pool water into said inlet of said docking station.

Embodiment 9

The docking station according to Embodiment 1 where water flow into said docking station inlet is established by pumping of water by said pool cleaner into and through said docking station and into said pool cleaner inlet when said pool cleaner is in said second mode.

Embodiment 10

The docking station according to Embodiment 1 further comprising a curved ramp having a proximal part extending downward from said frame and a distal part extending transversely and having a width dimension wider than the width dimension of said pool cleaner, said proximal part configured to receive and position said pool cleaner when it moves up said ramp for said pool cleaner inlet to be aligned with said docking station outlet, and said pool cleaner front portion to be adjacent said fastener.

Embodiment 11

The docking station according to Embodiment 1 further comprising a curved ramp having a proximal portion extending generally vertically downward from said frame and a distal portion extending generally horizontally, whereby a pool cleaner directed by its controller can be propelled onto said ramp's distal part, roll up said ramp being guided thereon, and then coupled to said docking station.

Embodiment 12

A method of filtering water in a pool, using a pool cleaner that has: (i) a body with front and rear portions and a lower portion, (ii) an internal chamber containing a pump and a water filter, said internal chamber having front and rear outlets in said front and rear portions respectively of said body, and having an inlet in said lower portion, (iii) a programmable controller configured to operate said pump to direct filtered water selectively through said front or rear outlets, and (iv) a valve in each of said outlet ducts, where each of said valves is operable to open when water is pumped out of said outlet, comprising the steps:

a. attaching a docking station to a pool structure, where said docking station has a pool water inlet and an outlet, said docking station being configured to be positioned with its inlet under the top water level of said pool water, b. receiving and releasably coupling said pool cleaner to said docking station, and c. operating said pump in said pool cleaner, as directed by said controller, to draw pool water through said docking station and into and through the filter in said pool cleaner, and to discharge filtered water back into said pool.

Embodiment 13

The method of filtering water in a pool according to Embodiment 12, where coupling said pool cleaner to said docking station further comprises positioning said pool cleaner inlet to be aligned with said docking station outlet.

Embodiment 14

The method of filtering water in a pool according to Embodiment 13 where said pool cleaner is configured to cooperate with said docking station: in a first mode where said pool cleaner is inactive, or a second mode where said pool cleaner draws pool water from said docking station, filters and discharges said filtered pool water back into said pool, or a third mode where said pool cleaner de-couples from said docking station.

Embodiment 15

The method of filtering water in a pool according to Embodiment 12 where coupling of said pool cleaner to said docking station comprises employing a fastener for releasably engaging said pool cleaner to said docking station.

Embodiment 16

The method of filtering water in a pool according to Embodiment 14 where said pool cleaner's releasable fastener includes a pivotable paddle, and said de-coupling in said third mode comprises directing said pump to discharge a water jet in the forward direction to impinge on and pivot said paddle to its open position, thereby releasing of said pool cleaner from said docking station.

Embodiment 17

The method of filtering water in a pool according to Embodiment 12 for filtering coarse debris before it enters the docking station inlet by positioning a filter in the path of water flow into said docking station inlet.

Embodiment 18

The method according to Embodiment 17 of filtering debris from water in a pool before it enters the docking station inlet, further comprises providing an inlet restrictor that reduces the water flow path and to thereby increase the speed of the water flow to better entrain debris to be filtered.

Embodiment 19

The method of filtering debris from water in a pool according to Embodiment 18 further comprises positioning a barrier in the area of pool water flow into the docking station inlet, said barrier having buoyancy such that it always impedes said water flow except the water that flows over the upper part of the barrier, and said barrier due to its buoyancy always has its upper part slightly below the top surface of the flowing water.

These and other advantages of the invention will be further understood and appreciated by those skilled in the art by reference to the following written specification, claims and appended drawings.

Figure 1:
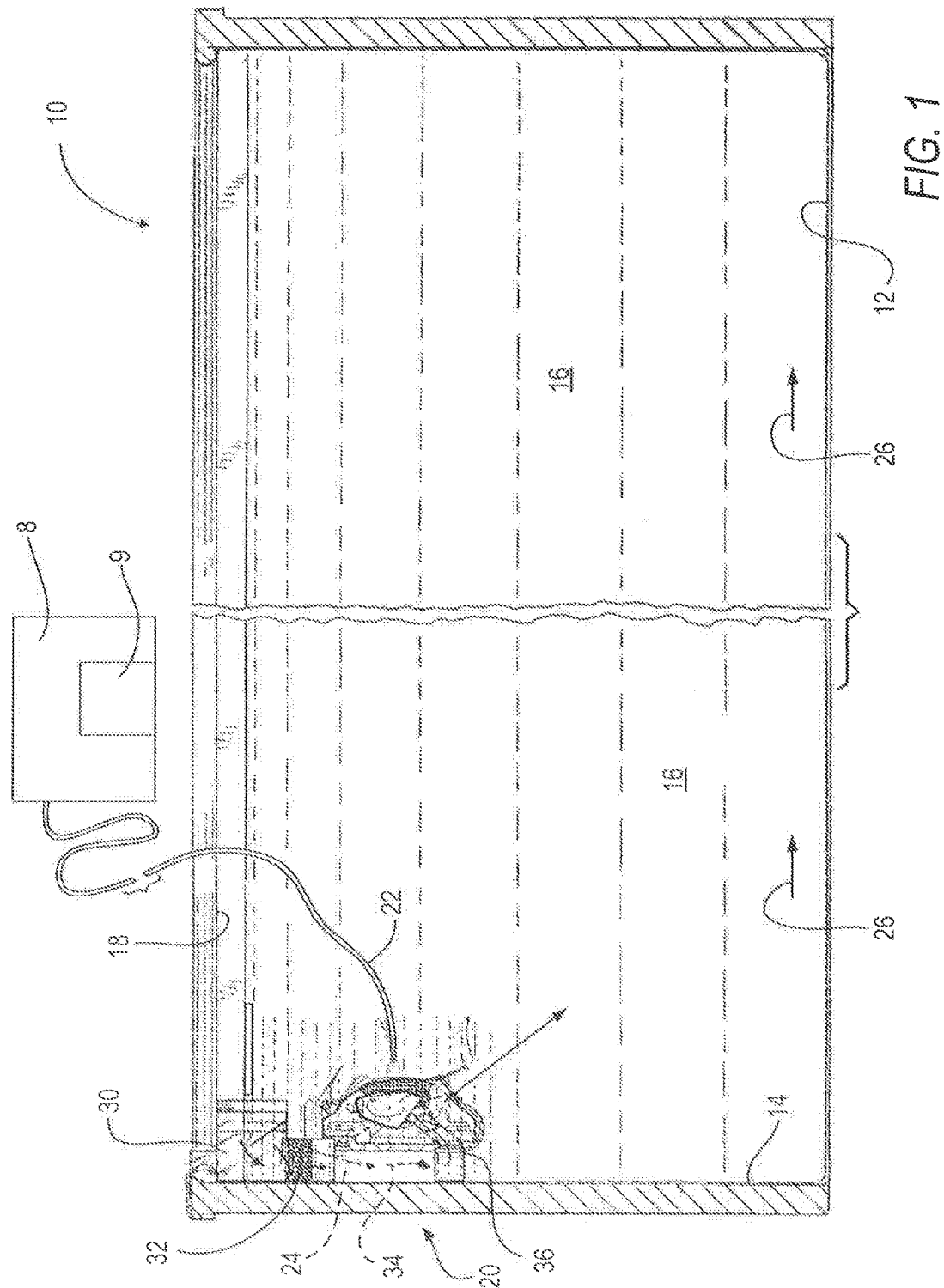
FIG. 1 is an elevational view in section of a pool containing water and a robotic pool cleaner shown coupled to the new docking station at one edge of the pool.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE PREFERRED EMBODIMENTS

FIG. 1 shows a pool 10 having a bottom surface 12, a vertical side wall surface 14, water 16 indicated by dashed lines and a top water surface 18. Also shown is a robotic pool cleaner 20 tethered to a remote power supply 8 via a power cable 22. The pool cleaner is illustratively shown coupled to a docking station 24 situated at the wall surface 14 near the top water surface 18. Arrows 26 indicate a typical path of the pool cleaner and cleaning along the bottom surface of pool.

In FIG. 1 the pool cleaner 20 is shown in a generally vertical orientation when it is coupled to the docking station 24. Arrow 30 indicates the water flow direction into a pre-filter 32 of debris, and arrows 34 indicate subsequent water flow into intake duct 36 of the pool cleaner, a second intake duct being shown more clearly in subsequent views.

Figure 2:
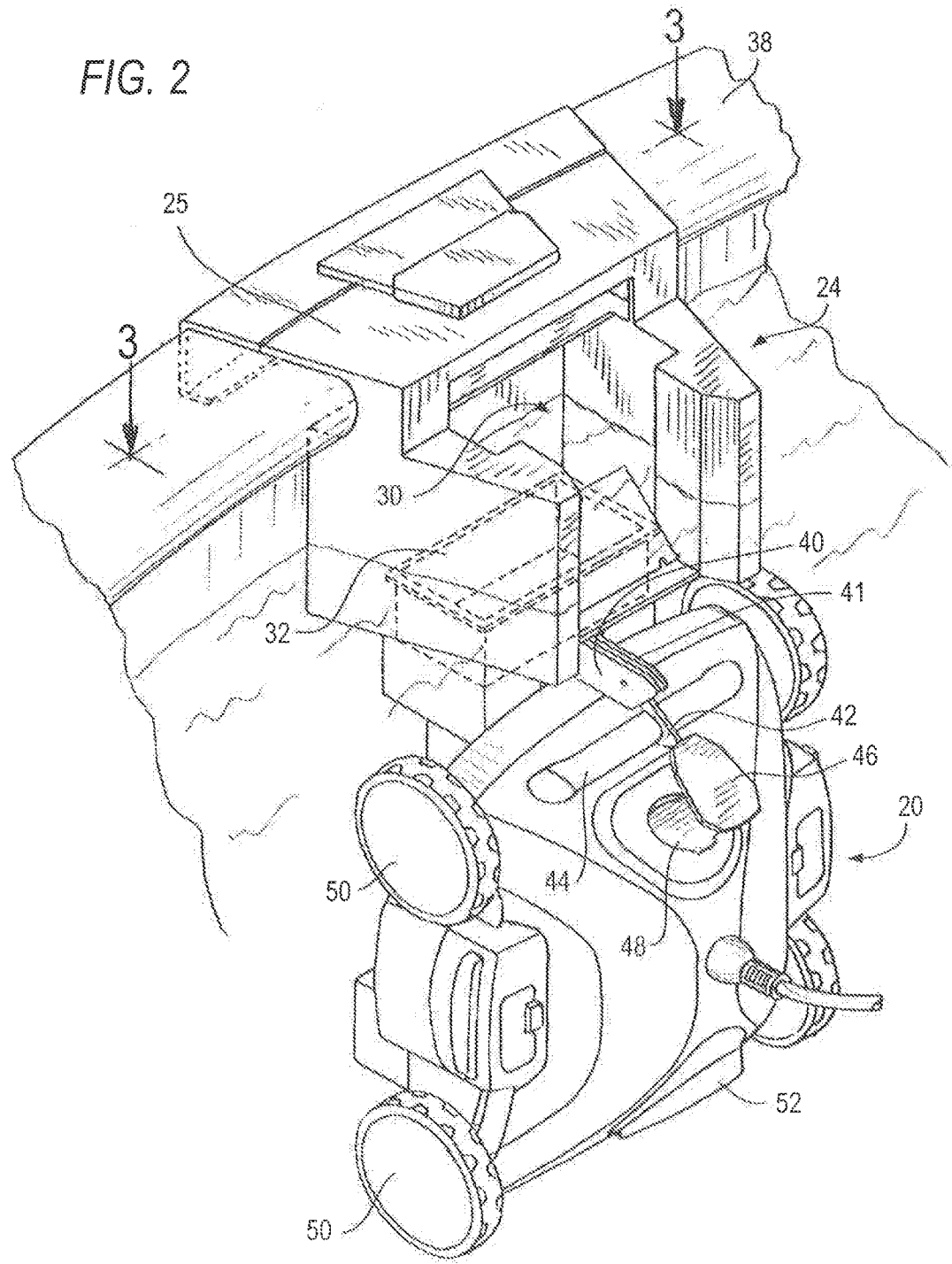
FIG. 2 is an enlarged fragmentary perspective view of the robotic pool cleaner coupled to the docking station shown in FIG. 1.

FIG. 2 illustrates the pool cleaner 20 in a generally vertical orientation where it is engaged and coupled to docking station 24 which has been secured onto an upper edge 38 of the pool or secured to another pool structure. As shown in FIGS. 1 and 2, arrow 30 indicates water descending initially into debris filter 32. For convenience filter 32 is illustrated as a rectangular perforated bin, although such shape of the bin is not considered limiting as the bin can be circular or other shapes. Filter 32 captures relatively large articles of debris 32A (see FIG. 5) such as leaves and twigs, paper, plastic, etc. to prevent them from subsequently entering the pool cleaner and rapidly causing a blockage from the accumulation of debris.

Also seen in FIG. 2 is a fastener of the docking station 24 such as a latch 40 with a hook element 42 that is configured to releasably engage with a catch bar (latch-engaging element) 44 of the cleaner. Preferably, the catch bar 44 is also the pool cleaner carrying handle located at the top forward end of the pool cleaner 20. As seen, latch 40 is pivoted downwardly about its pivot axis 41 so that hook element 42 partially encircles and captures catch bar 44, thus restraining pool cleaner 20 from dropping downward and away from docking station 24.

Latch 40 also has an extending member or arm 46 formed as a generally flat panel or paddle that can pivot downward to be adjacent and generally in line with the pool cleaner's front end water flow outlet duct 48. The operation of this arm or paddle 46 is discussed below in further detail.

Also shown in FIG. 2 are front and rear free-wheeling wheels or other rotary support elements 50 which facilitate rolling movement of pool cleaner 20. As illustratively shown, the wheels are not driven by an electric motor and/or transmission. Rather, the wheels rotate freely, since the illustrative pool cleaner 20 is driven forward and rearward by pressurized water jets which are selectively and alternately discharged from the front and rear outlets 48, 52, as discussed below in further detail. A person of ordinary skill in the art will appreciate that the docking station 24 is not limited to use with jet driven cleaners, as robotic cleaners which have driven wheels and/or tracks can also be docked and operate in conjunction with the docking station 24 of the present invention in a similar manner as described herein.

Figure 3:
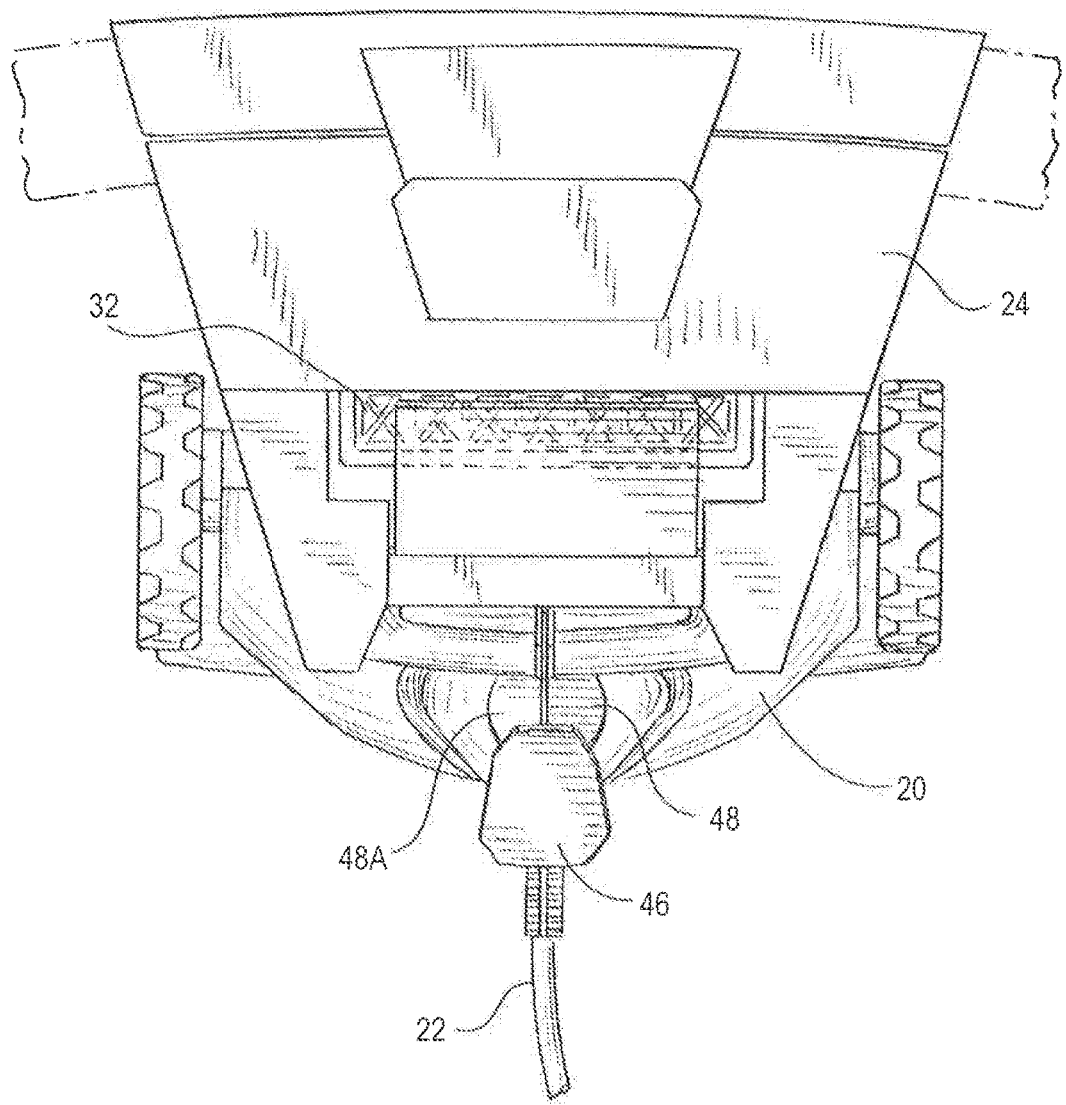
FIG. 3 is a top plan view taken along line 3-3 in FIG. 2 of the robotic pool cleaner coupled to the docking station.

FIG. 3 is a sectional view taken along line 3-3 in FIG. 2 showing a top plan view with pool cleaner 20 in vertical position coupled to docking station 24. In this view can be seen a portion of debris filter 32 that receives downward descending water as described in connection with FIGS. 1 and 2. Also seen in FIG. 3 is paddle 46 of latch 40 that becomes aligned with front outlet water flow from duct 48 of the pool cleaner 20.

Figure 4:
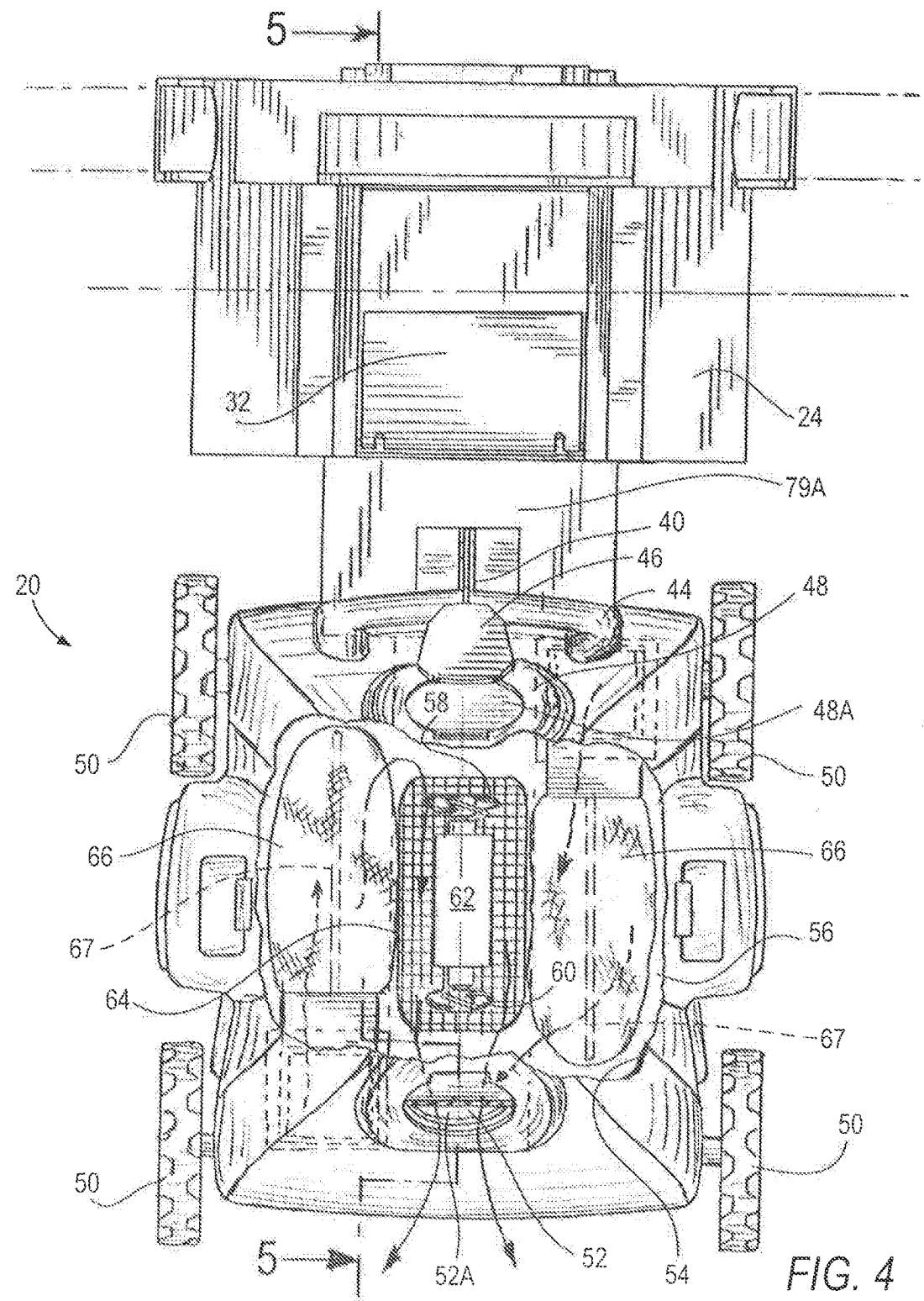
FIG. 4 is an elevational view of the robotic pool cleaner coupled to the docking station as seen in FIG. 2.
Figure 5:
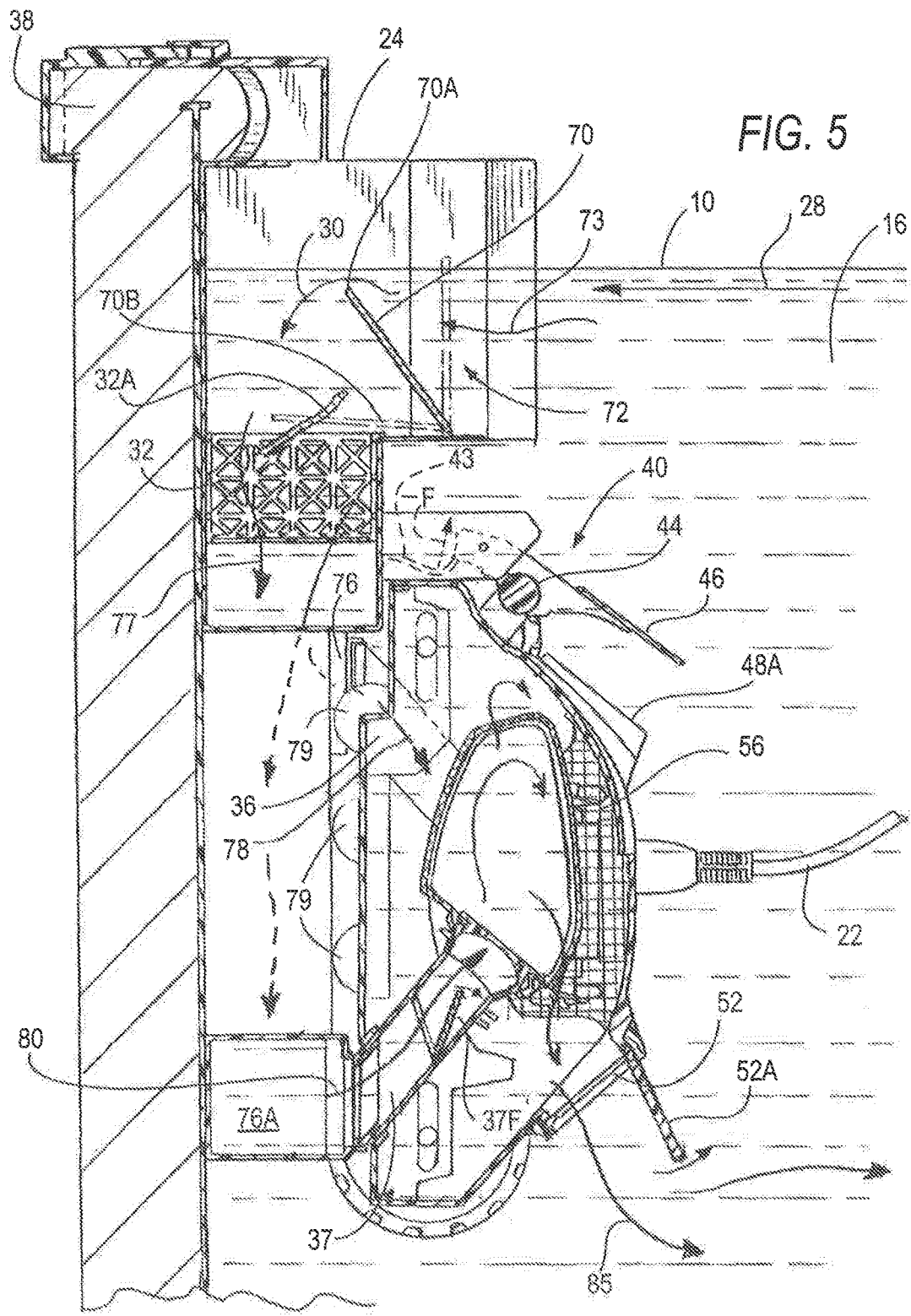
FIG. 5 is a side elevational view partially in section of the pool and pool cleaner attached to the docking station seen in FIGS. 1-4.

FIG. 4 is an elevational view corresponding to the perspective elevational view of FIG. 2 and the top plan view in FIG. 3, all showing the pool cleaner 20 engaged and coupled to docking station 24. In FIG. 4 are seen pool cleaner 20 with its free-wheeling wheels 50, latch 40, latch arm/paddle 46 engaging the cleaner handle or catch bar 44 which is illustratively adjacent the pool cleaner's front outlet water flow duct 48 of the pool cleaner 20. Seen in both FIGS. 4 and 5 is a rear outlet duct 52 opposite front outlet duct 48. FIG. 4 also shows a generally rectangular or oval breakaway line 54 which is provided in the drawing to expose the central internal chamber 56 which is formed within the housing underneath the top surface of pool cleaner 20. Inside the chamber 56 are seen an electric motor 62 which drives opposing propellers 58 and 60, preferably from a single drive shaft, although such configuration is not limiting. The electric motor 62 and drive shafts extend along the longitudinal axis of the cleaner 20. One or more filter bag(s) 66 are disposed in the interior chamber 56 to capture debris entering the chamber from the inlet(s). Although the cleaner 20 is illustratively described as including one or more filter bags, such filter type is not considered limiting as other filters can be implemented in the cleaner including a filter bucket(s), screen mesh containers, filter cartridges, and the like. In the embodiment in which a filter bag is utilized in the cleaner, a motor 62 can optionally be generally surrounded by screen 64 for added protection, for example, to ensure that the filter bag(s) 66 cannot interfere with the rotation of propellers 58 and 60. During routine monitoring, adjusting, cleaning or repair, filter screen 64 and filter bags 66 would be cleaned and/or replaced. When using filter containers with a generally fixed shape filter screen 64 would be unnecessary.

FIG. 5 corresponds in part to FIGS. 1-4 showing water flow indicated by arrow 28 (FIGS. 1 and 5) at the top surface of water 16 in pool 10, which water is flowing to the left as seen and approaching docking station 24 which is engaged near the top edge 38 at the waterline of the pool. In FIG. 5 water descending via arrow 30 toward and into a pre-filter or strainer 32, first passes pivotal panel 70, which generally funnels and/or constricts water flow shown by arrows 72, 73 into a smaller space, with the result that water flow in the area of arrow 30, i.e., over the top edge 70A of the panel 70, flows more rapidly and thereby enhances the carrying or entrainment of debris over edge 70A of panel 70 and downward into pre-filter/strainer 32. Panel 70 tends to pivot according to the water level which varies in the pool. For example, panel 70 could pivot downward to the dotted line position 70B if the water level were to drop from the present waterline as illustratively shown in the FIG. 5. Also shown in FIG. 5 at the top of debris filter/strainer 32 is a bent twig 32A, which symbolically indicates relatively large debris that will be captured by this filter strainer 32.

Panel 70 can be configured and constructed to have weight and buoyancy such that its top edge 70A is situated generally near but below the water level top surface 18. The height of panel 70 is such that if it is inclined downward to position indicated at 70B, there will remain sufficient space for downward water flow, as illustrated by arrow 32 in FIG. 5. With this open passage zone for water flow (i.e. not fully blocked), the possibility will be reduced of pump motor 62 of the cleaner 20 being overloaded while trying to suction water through a blocked passage. However, when the water level is normally higher, as seen in FIG. 5, panel 70 will occupy its highly inclined position, allowing a wide opening for water flow into the top filter 32.

FIG. 5 further shows water flow indicated by arrow 77 exiting filter/strainer 32 and flowing via arrow 78 into the pool cleaner's front inlet duct 36, and via arrow 80 into rear inlet duct 37. Ducts 36 and 37 direct the flow of water and debris directly into the filter bags 66 positioned in the central chamber 56. Each duct includes a valve or simple pivotal closure flap such as flap 37F in rear inlet duct 37 and a corresponding flap not seen in front inlet duct 36. These valves prevent or at least restrict backflow.

Figure 6:
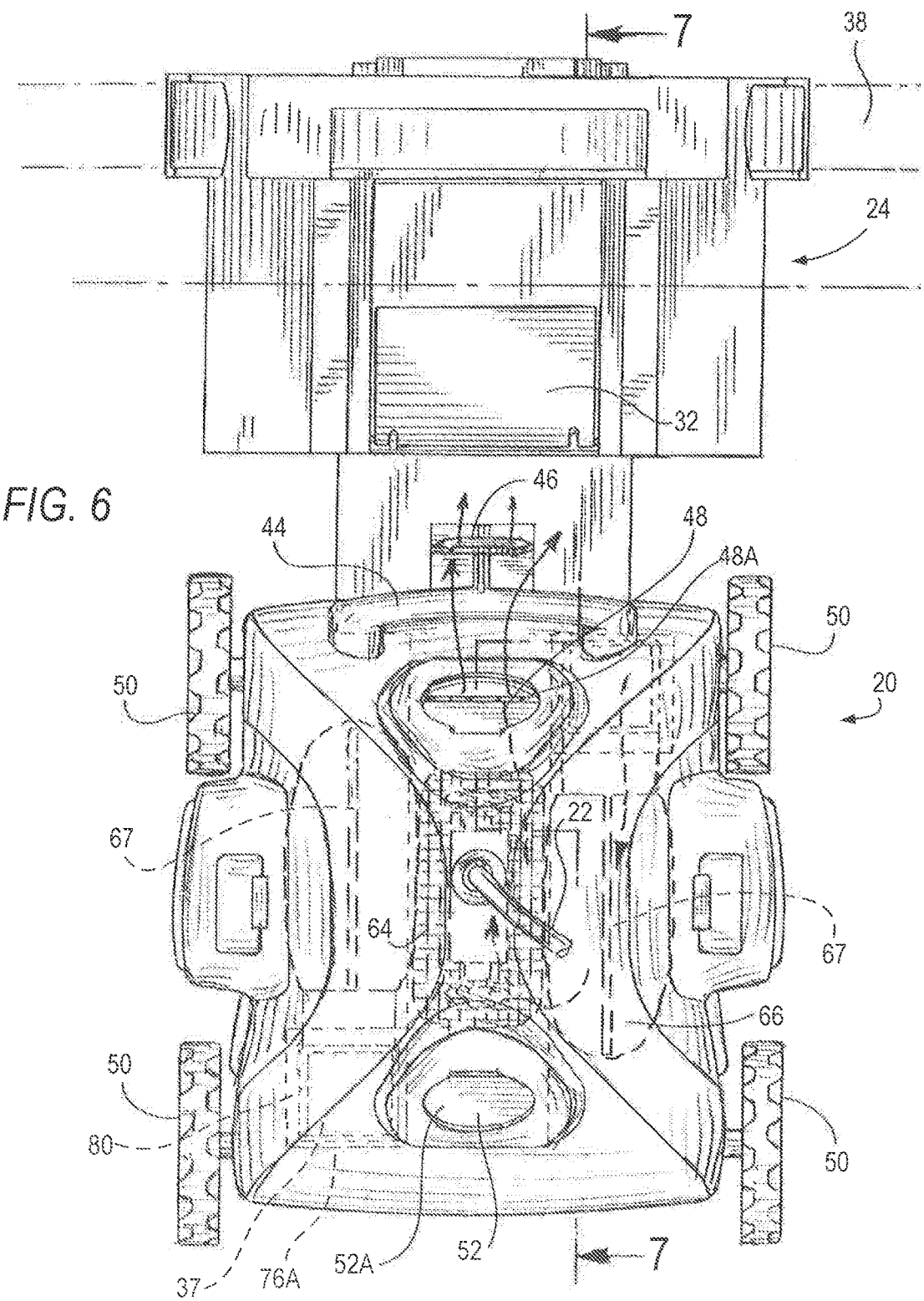
FIG. 6 is an elevational view similar to FIG. 4 of the robotic pool cleaner coupled to the docking station.

In FIGS. 5 and 6 the arrow marked 85 indicate a water jet out of the rear duct opening. This occurs when the pump front and rear propellers 58, 60 are rotated in a first rotational direction (e.g., counter-clockwise) causing water jet out of the rear opening. Such pump action would produce suction at the front discharge port; however, inflow of water is blocked by flexible and/or pivotal flap 48A seen in FIGS. 5 and 6. By closing front outlet water flow duct 48 all the filtered water is discharged as a water jet out of rear outlet water flow duct 52. From this rear end discharge is a secondary benefit of urging the pool cleaner forward and into more secure engagement with the docking station.

As further described below, when it is desired to have the cleaner released from the docking station 24, the polarity of motor 62 is reversed to thereby change the rotation of the propellers in an opposite direction (e.g., clockwise), so that water jet is discharged only out of the front outlet 48. In that case a similar flexible or pivotal flap valve 52A seen in FIGS. 4-7 will close the rear end opening 52, seen in FIGS. 2 and 6, and will direct filtered water only out of the previously forward outlet opening 48. In other words, the forward direction that the cleaner moves at a given time determines the nomenclature of the front and rear ends and ports of the cleaner 20.

Figure 7:
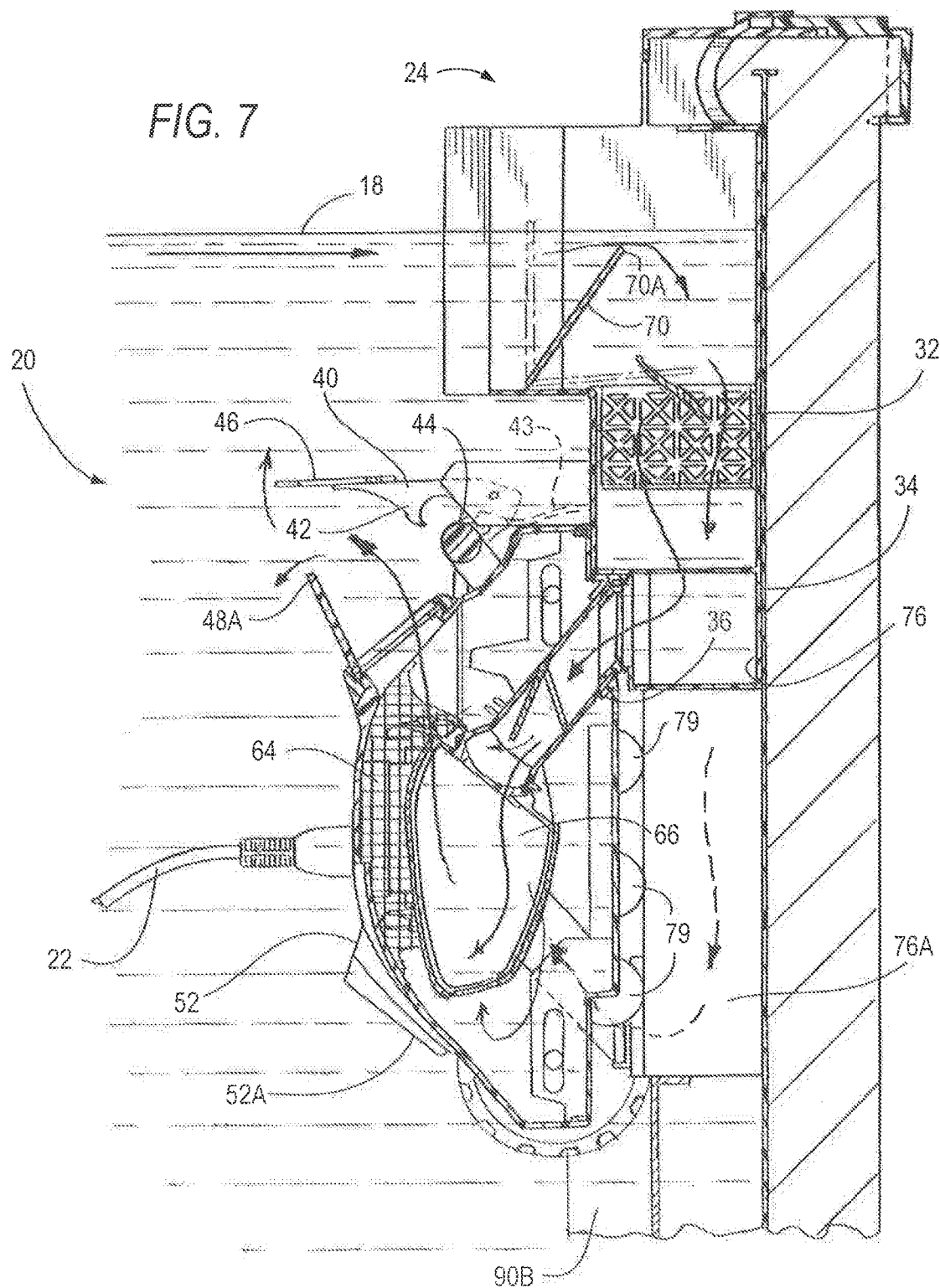
FIG. 7 is a fragmentary sectional view taken along line 7-7 in FIG. 6 showing the pool cleaner in its disconnect mode from the docking station.

When cleaner 20 is docked on the docking station 24, the rotating propellers 58 draw water inward through said two inlet ducts 36, 37, past pre-filter 32 in docking station, and past secondary filters filter bags 66 in the cleaner, and thence to front outlet duct 48 or rear outlet duct 52, depending on the direction of rotation of the propellers. As shown in FIGS. 6 and 7 the flow direction through one or the other of said front and rear outlet ducts will be discussed below as to the effect that such has on the relationship of pool cleaner 22 and the docking station 24.

FIG. 7 is essentially a mirror image of FIG. 5, showing an elevation partially in section of the pool cleaner associated with the docking station. In FIG. 5, the pool cleaner is coupled to the docking station 24 where its handle/catch bar 44 is captured by hook 42, latching the pool cleaner 20 into its removably fixed operational state. In both FIGS. 5 and 7 previously described arrows show the flow path of water over top edge 70A of pivot panel 70, downward through filter/strainer 32, further downward into intake ducts 36, 37 of the pool cleaner, thence through filter bags 66, and finally discharged as water jets by propellers 58, 60 to exit via rear outlet duct 52 seen in FIG. 6 or via front exit duct 48 as seen in FIG. 7.

Returning to FIG. 5, when motor 62 drives propellers 58, 60 in a first direction to direct water flow out of the rear outlet duct 52, a water propulsion force tends to urge pool cleaner 20 upward and against the docking station bumper 61 and help maintain the cleaner into engagement with the docking station. During that time water is not discharged through front outlet exhaust opening 48 which is closed by flap 48A seen in FIGS. 3-5. Alternatively, when disengagement of pool cleaner 20 from docking station 24 is desired, motor 62 and propellers 58, 60 are directed to rotate in the opposite direction causing a water jet and thrust out of front exhaust opening 48. Additionally, the water jet impacts on paddle 46 of latch 42, overcoming spring force indicated by arrow F of spring 43, such that latch 42 pivots up and off catch bar 44 and cleaner 20 is free to move downward from bumper 61. The upward jet flow urges or assists cleaner 20 to separate from the docking station 24.

Figure 8:
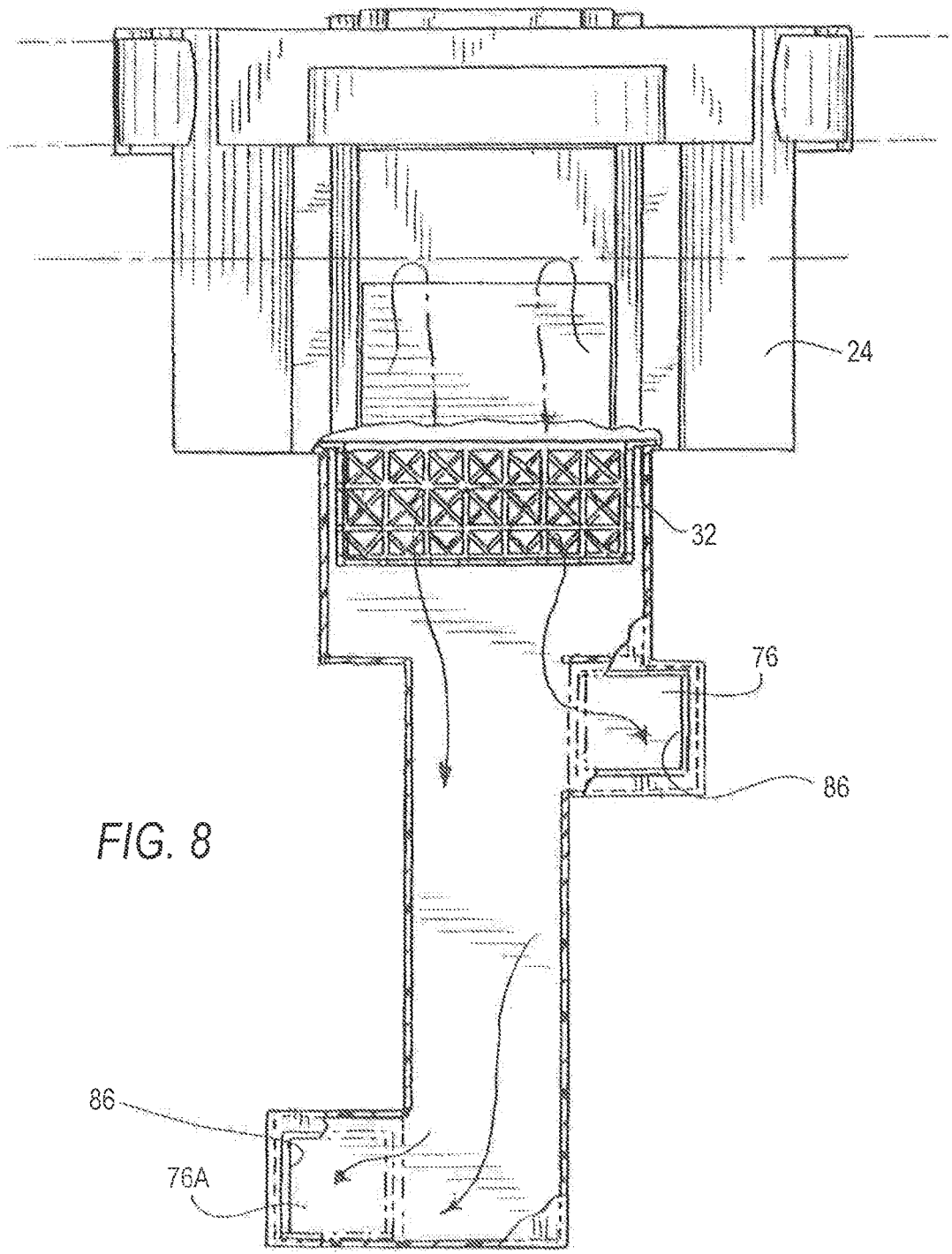
FIG. 8 is an elevational view of the docking station of FIGS. 1-5 with the robotic pool element not present.

FIG. 8 corresponds to FIG. 6 as a front elevational view of the docking station, but is shown with the pool cleaner removed therefrom for clarity of illustration to show the docking station alone. The docking station 24 illustratively includes a pair of outlets 76, 76A which are offset from each other and configured to abut against and reside over the corresponding inlets of the cleaner 20. A person of ordinary skill in the art will appreciate that the number and configuration of the outlets 76 is not limiting, but is dependent on the number and configuration of the inlets in the cleaner. Preferably, the docking station outlets 76, 76A include a gasket 86 or other sealing element to ensure that water flow directly into the cleaner inlets without leakage back into the pool.

Figure 9:
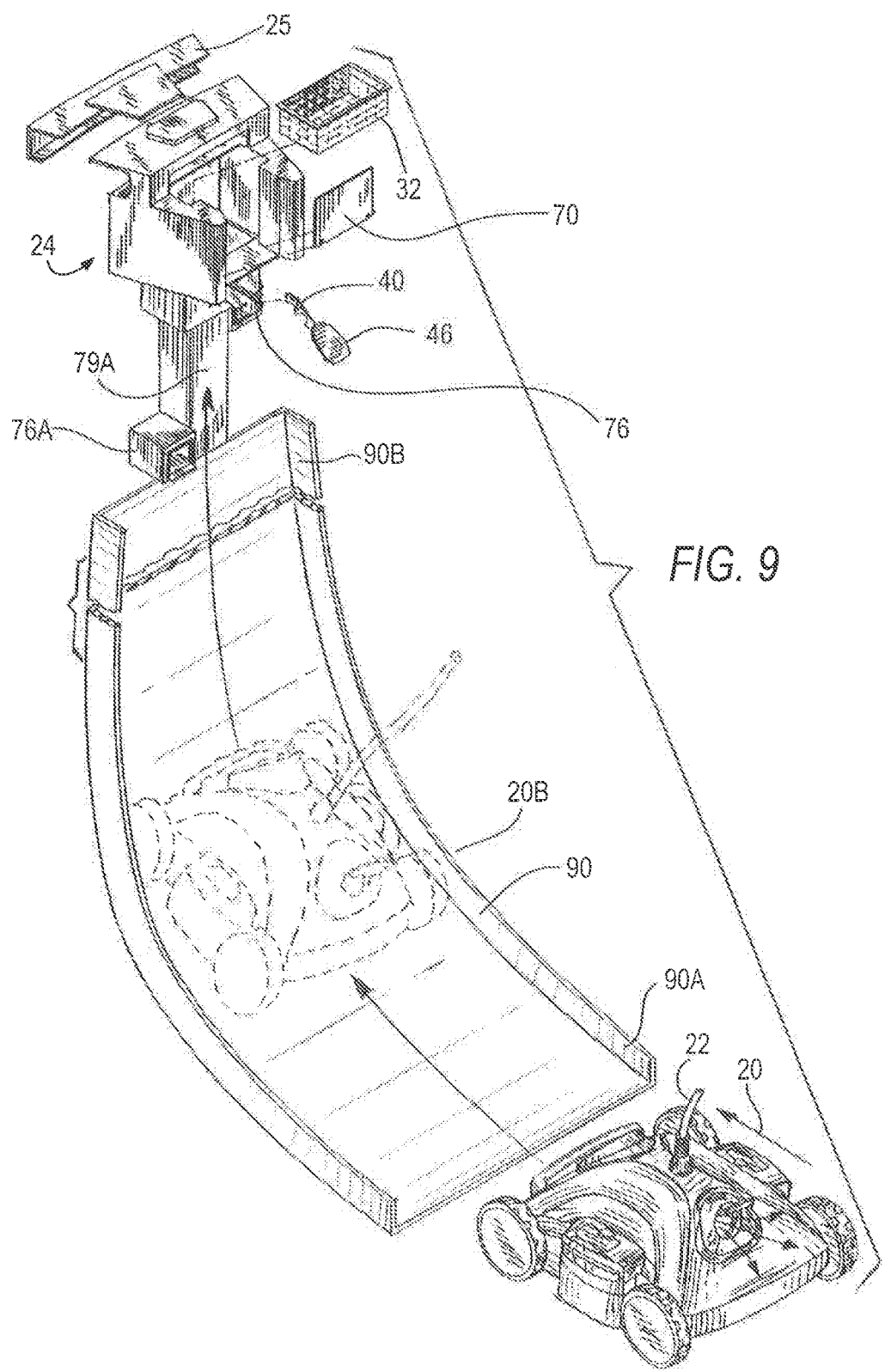
FIG. 9 is an exploded perspective view of the docking station and robotic pool cleaner corresponding to the docking station and robotic pool cleaner of FIGS. 1-8, with an optional entry ramp.

FIG. 9 is an exploded view showing components of the docking station 24 along with ramp 90 by which pool cleaner 20 is directed to move up the ramp. The ramp 90 can be wider at it lower end 90A and tapers upwardly in a funnel-like manner towards its top end 90B, which directs pool cleaner 20 to arrive in the orientation and position needed to easily engage and couple with the latch 40 of the docking station. Above the ramp and between docking stations outlets 76 and 76A is a guide rail 79A to receive and support wheels 79 of the cleaner when it is docked as seen. Wheels 79 are also visible in FIGS. 5 and 7. In dashed line is shown the pool cleaner 20B traveling up the ramp 90 by its pressurized water jet flowing out of rear outlet opening 52. The cleaner 20 climbs upwards on the ramp 90 until it arrives in its final destination against the bumper 61, and where the cleaner's inlet ducts become aligned with docking station outlets 76 and 76A (see FIGS. 5, 8 and 9) in a watertight interface so that pool water flowing into docking station 24 can be directed into pool cleaner filters and then returned as filtered water back into the pool. Accordingly, the docking station retains the pool cleaner in a vertical orientation along the sidewall of the pool, and acts as a conduit or duct to allow the flow of water and debris proximate the waterline to be filtered by the cleaner and optionally the docking station itself.

The cleaner 20 is responsive to command signals from a controller 100 which assists with the cleaning operations of the pool. The controller is preferably a micro-controller that can be installed on-board the cleaning device 10. Alternatively, the controller can be installed in an external power supply 102 (seen in FIG. 1) from which control signals are sent over the power cable electrically coupled between the external power supply and the cleaning device 10. The controller generally includes a micro-controller or microprocessor, one or more input/output (I/O interfaces, support circuitry, as well as memory for storing various operational and cleaning programs. Communications between the various microcontroller components are facilitated via one or more bus lines.

The processor cooperates with conventional support circuitry, such as power supplies, clock circuits, cache memory and the like, as well as circuits that assist in executing software routines stored in the memory. The memory can be a single memory device or separate memory devices that function as program storage and data storage. The program storage can include one or more cleaning pattern routines and other operational routines. The cleaning pattern routines can be preinstalled by the manufacturer with different cleaning patterns and/or durations, and thereafter selectable by the end-user. The data storage can include user-input data, such as dimensions/configuration of the pool for which the cleaning device 20 will be used, as well as sensor data, and the like. It is contemplated that some of the process steps discussed herein as software processes can be implemented within hardware, for example, as circuitry that cooperates with the processor to perform various steps. In one embodiment, the micro-processor executes a cleaning pattern routine using the pool dimension/configuration data previously inputted into the memory by a field technician or end-user.

The controller also contains input/output (I/O) circuitry that forms an interface between the various functional elements communicating with the controller. For example, the microcontroller can send instructions to a switch in communication with the pump motor 62 to reverse polarity and thereby change the rotational direction of the propellers at predetermined times in accordance with the cleaning pattern routines.

Although the controller discussed as being a microcontroller or a general-purpose computer that is programmed to perform various defined and/or control functions for specific purposes in accordance with the present invention, the invention can be implemented in hardware such as, for example, an application specific integrated circuit (ASIC). As such, it is intended that the processes described herein be broadly interpreted as being equivalently performed by software, hardware, or a combination thereof.

Although the docking station 24 has been disclosed for use with robotic cleaners that are propelled by one or more pressurized water jets, such configuration and cleaner type is not considered limiting. For example, it will be appreciated that the docking station can configured for use with other types of cleaners, such as those driven by wheel or track drives. As well, it will be appreciated that the docking station can be configured for "universal" use for various cleaner models/configurations. For example, the docking station can include user-adjustable water flow outlets 76 which can be selectively moved and locked at various positions so as to align with different models of cleaners which have their inlets located in different positions. The adjustable outlets can include telescoping ducts that are slidable relative to each other laterally or longitudinally so that the outlets 76 can be aligned over and cover the cleaner inlet(s). As well, the outlets 76 can include a selectively closable panel, e.g., slidable or hinged panel to close the outlets 76 to thereby prevent the flow of water into the cleaner. Closing the outlets 76 may be desirable where the user wants to dock the cleaner but allow the water to flow directly through the cleaner 20 inlets, instead of the docking station 24 into the pool cleaner.

While the invention has been described in conjunction with several embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A docking station attachable to a pool structure for releasably engaging a submersible pool cleaner that is operable in a pool of water, the submersible pool cleaner including an inner chamber with a pump, a filter, at least one inlet port and at least one outlet port, the docking station comprising:
   a. a frame with a water chamber therein;
   b. a coupler for releasably coupling said pool cleaner to said frame;
   c. a duct system including a duct inlet for receiving pool water into said water chamber and at least one duct outlet for discharging water from said water chamber, the at least one duct outlet being configured for coupling with the at least one inlet port of said pool cleaner; and
   wherein said docking station cooperates with said submersible pool cleaner in a first mode of operation in which said pool cleaner is docked on the docking station and draws in pool water through the at least one duct outlet of said docking station and the at least one inlet port of the pool cleaner, filters the water and discharges filtered pool water back into said pool, and a second mode of operation in which said pool cleaner decouples from said docking station.

2. The docking station according to claim 1, wherein the at least one outlet port of the pool cleaner includes front and rear outlet ports and the pool cleaner is configured:
   a. to discharge filtered water from said inner chamber as a rear water jet through said rear outlet port while said front outlet port is closed during said first mode, or
   b. to discharge filtered water from said inner chamber as a front water jet through said front outlet port while said rear outlet port is closed during said second mode.

3. The docking station according to claim 2 wherein said coupler comprises a fastener comprising a paddle movable between said open and closed states, and in said second mode said front water jet strikes and moves said paddle to its open condition, wherein said pool cleaner is de-coupled from said docking station and said front water jet urges said pool cleaner to move downward from said docking station.

4. The docking station according to claim 1, in which said pool cleaner being in said first mode is coupled to said docking station in an orientation in which said pool cleaner's at least one inlet port is aligned with the docking station's at least one duct outlet port, such that the pump in said pool cleaner is configured to draw pool water into and through said docking station's water chamber and into and through said pool cleaner's filter, and thereafter discharge filtered water through a selected one of said pool cleaner's outlet ports.

5. The docking station according to claim 1 further comprising a pre-filter in said frame, wherein said pump in said pool cleaner is configured to draw water through said pre-filter before the pool water enters said pool cleaner.

6. The docking station according to claim 1, further comprising an inlet restrictor that is adjustable to vary a rate in which the pool water is drawn into said water chamber of said docking station.

7. The docking station according to claim 6, wherein said inlet restrictor restricts an inlet opening into said water chamber, and increases a rate of water flow of said pool water entering said water chamber in said docking station.

8. The docking station according to claim 6, wherein said inlet restrictor comprises a panel having upper and lower portions and being pivotable about said lower portion; and said inlet restrictor has a buoyancy such that said upper portion tends to be positioned below a top surface of the water flow of said pool water into said inlet opening of said docking station.

9. The docking station according to claim 1, wherein water flowing into said docking station inlet is established by pumping of water by said pool cleaner into and through said docking station and into said at least one inlet port of the pool cleaner when said pool cleaner is in said first mode.

10. The docking station according to claim 1 further comprising a curved ramp having a proximal part extending downward from said frame and a distal part extending transversely and having a width dimension wider than the width dimension of said pool cleaner, said proximal part configured to receive and position said pool cleaner when it moves up said ramp for said at least one inlet port of the pool cleaner to be aligned with said at least one duct outlet of the docking station, and a front portion of said pool cleaner being adjacent to said coupler.

11. The docking station according to claim 1 further comprising a curved ramp having a proximal portion extending generally vertically downward from said frame and a distal portion extending generally horizontally, wherein the pool cleaner is directed by a controller operable to propel the pool cleaner onto said ramp distal part, move up said ramp, and automatically couple to the coupler of said docking station.

12. The docking station according to claim 1, wherein the at least one inlet port of said pool cleaner includes two spaced apart inlet ports, and the at least one duct outlet of said docking station includes two duct outlets spaced apart similarly as said spaced-apart inlet ports of said pool cleaner, such that when said pool cleaner is coupled to said docking station, the spaced-apart inlet ports of the pool cleaner are fluidly coupled to said spaced-apart duct outlets of the docking station, wherein water is drawn by said pump in said pool cleaner from said docking station water chamber into the internal chamber of said pool cleaner.

13. The docking station according to claim 1, wherein the coupler comprises a fastener having open and closed states.

14. The docking station according to claim 1, wherein said docking station also cooperates with said submersible pool cleaner in a third mode of operation in which said pool cleaner is docked on the docking station and is inactive.

15. A method of filtering water in a pool, using a pool cleaner that has: (i) a body with front and rear portions and a lower portion, (ii) an internal chamber containing a pump and a water filter, said internal chamber having front and rear outlets in said front and rear portions respectively of said body, and having an inlet in said lower portion, a valve in each of said front and rear outlets, and (iii) a programmable controller configured to operate said pump to direct filtered water selectively through said front or rear outlets, wherein each of said valves is openable when a jet stream of filtered water is pumped out of said front and rear outlets, the method comprising the steps of:
a. attaching a docking station to a pool structure, wherein said docking station has a pool water inlet and an outlet, said docking station being configured to be positioned with the inlet being under a top water level of said pool water,
b. receiving and releasably coupling said pool cleaner to said docking station, and
c. as directed by said controller, operating said pump in said pool cleaner to draw pool water through said docking station and into and through the water filter in said pool cleaner, and discharging filtered water back into said pool.

16. The method of filtering water in a pool according to claim 15, wherein the step of receiving and releasably coupling said pool cleaner to said docking station further comprises positioning said pool cleaner inlet to be aligned with said docking station outlet.

17. The method of filtering water in a pool according to claim 16, wherein said pool cleaner is configured to cooperate with said docking station in a first mode in which said pool cleaner draws pool water from said docking station, filters and discharges said filtered pool water back into said pool, or a second mode in which said pool cleaner de-couples from said docking station.

18. The method of filtering water in a pool according to claim 15, wherein the step of receiving and releasably coupling of said pool cleaner to said docking station comprises employing a fastener for releasably engaging said pool cleaner.

19. The method of filtering water in a pool according to claim 17, wherein said pool cleaner's releasable fastener includes a pivotable paddle, and said de-coupling in said second mode comprises directing said pump to discharge a water jet in a forward direction to impinge on and pivot said paddle to an open position, such that said pool cleaner is released from said docking station.

20. The method of filtering water in a pool according to claim 15, further comprising the step of filtering debris before it enters the docking station inlet by positioning a pre-filter in said docking station inlet.

21. The method of filtering water in a pool according to claim 20, wherein the step of filtering debris before it enters the docking station inlet further comprises providing an inlet restrictor that reduces a water flow into the docking station inlet such that a rate of water flow into the docking station inlet increases to better entrain debris to be filtered.

22. The method of filtering water in a pool according to claim 21 further comprising positioning a barrier in an area of pool water flow into the docking station inlet, said barrier having a buoyancy such that said barrier impedes said water flow except for a portion of the water that flows over an upper part of the barrier, and said barrier due to its buoyancy always has its upper part slightly below a top surface of the flowing water.

23. The method of filtering water in a pool according to claim 17, wherein said pool cleaner is configured also to cooperate with said docking station in a third mode in which said pool cleaner is inactive.

* * * * *